United States Patent
Li et al.

(10) Patent No.: US 11,186,711 B2
(45) Date of Patent: Nov. 30, 2021

(54) SEMI-CRYSTALLINE POLYOLEFIN-BASED ADDITIVE MASTERBATCH COMPOSITION

(71) Applicant: Dow Global Technologies LLC, Midland, MI (US)

(72) Inventors: Dachao Li, Royersford, PA (US); Rajen M. Patel, Freeport, TX (US); Timothy J. Person, Pottstown, PA (US); Jeffrey M. Cogen, Flemington, NJ (US); Bharat I. Chaudhary, Princeton, NJ (US)

(73) Assignee: DOW GLOBAL TECHNOLOGIES LLC, Midland, MD (US)

( * ) Notice: Subject to any disclaimer, the term of this patent is extended or adjusted under 35 U.S.C. 154(b) by 293 days.

(21) Appl. No.: 16/343,898

(22) PCT Filed: Oct. 31, 2017

(86) PCT No.: PCT/US2017/059224
§ 371 (c)(1),
(2) Date: Apr. 22, 2019

(87) PCT Pub. No.: WO2018/085239
PCT Pub. Date: May 11, 2018

(65) Prior Publication Data
US 2019/0248993 A1 Aug. 15, 2019

Related U.S. Application Data

(60) Provisional application No. 62/416,407, filed on Nov. 2, 2016.

(51) Int. Cl.
| | |
|---|---|
| *C08L 23/26* | (2006.01) |
| *C08J 3/22* | (2006.01) |
| *C09D 7/63* | (2018.01) |
| *C08F 110/02* | (2006.01) |
| *C08K 5/01* | (2006.01) |
| *C08K 5/18* | (2006.01) |
| *C08K 5/25* | (2006.01) |
| *C08K 5/372* | (2006.01) |
| *C09D 123/26* | (2006.01) |
| *H01B 3/44* | (2006.01) |

(52) U.S. Cl.
CPC ............ *C08L 23/26* (2013.01); *C08F 110/02* (2013.01); *C08J 3/223* (2013.01); *C08J 3/226* (2013.01); *C08K 5/01* (2013.01); *C08K 5/18* (2013.01); *C08K 5/25* (2013.01); *C08K 5/372* (2013.01); *C09D 7/63* (2018.01); *C09D 123/26* (2013.01); *H01B 3/441* (2013.01); *C08J 2323/08* (2013.01); *C08J 2351/06* (2013.01); *C08J 2423/02* (2013.01); *C08J 2423/06* (2013.01); *C08K 2201/014* (2013.01); *C08L 2201/08* (2013.01); *C08L 2203/202* (2013.01); *C08L 2205/025* (2013.01); *C08L 2207/062* (2013.01); *C08L 2310/00* (2013.01)

(58) Field of Classification Search
CPC .............. C08L 23/26; C08L 2203/202; C08L 2207/062; C08L 2310/00; C08L 2201/08; C08L 2205/025; C08J 3/226; C08J 3/223; C08K 5/18; C08K 5/01; C08K 5/372; C08K 5/25; C08K 2201/014; C09D 123/26; C09D 7/63; H01B 3/441; C08F 11/02
USPC ......................................................... 428/515
See application file for complete search history.

(56) References Cited

U.S. PATENT DOCUMENTS

| | | |
|---|---|---|
| 3,984,940 A | 10/1976 | Reich |
| 4,255,303 A | 3/1981 | Keogh |
| 4,368,280 A | 1/1983 | Yui et al. |
| 5,034,442 A | 7/1991 | Hirose et al. |
| 5,066,752 A | 11/1991 | Favstritsky et al. |
| 5,202,191 A | 4/1993 | Kato et al. |
| 5,367,030 A | 11/1994 | Gau et al. |
| 5,430,091 A | 7/1995 | Mahabir |
| 5,929,129 A | 7/1999 | Feichtinger |
| 6,441,097 B1 | 8/2002 | Blank et al. |
| 6,936,655 B2 | 8/2005 | Borke et al. |
| 6,936,671 B2 | 8/2005 | Mehta et al. |
| 6,998,443 B2 | 2/2006 | Lee et al. |
| 7,514,489 B2 | 4/2009 | Granada, Jr. et al. |
| 7,781,557 B2 | 8/2010 | Fagrell et al. |
| 7,842,772 B2 | 11/2010 | Fagrell et al. |
| 7,851,558 B2 | 12/2010 | King et al. |
| 9,147,784 B2 | 9/2015 | Shirahige et al. |
| 2002/0198335 A1 | 12/2002 | Bernier et al. |
| 2005/0049335 A1 | 3/2005 | Lee et al. |
| 2007/0155866 A1 | 7/2007 | Biscoglio et al. |
| 2008/0023680 A1 | 1/2008 | Inoue et al. |
| 2008/0176981 A1* | 7/2008 | Biscoglio ............. C08K 5/0008 524/284 |

(Continued)

FOREIGN PATENT DOCUMENTS

| | | |
|---|---|---|
| EP | 0501340 B1 | 4/1996 |
| EP | 0736065 | 10/1996 |

(Continued)

OTHER PUBLICATIONS

"Welcome to Accurel® Systems," Membrana GmbH, Accurel@ Systems, 2010, p. 1-5, Obernburg, Germany.

(Continued)

*Primary Examiner* — Hui H Chin

(57) ABSTRACT

An additive masterbatch composition comprising a semi-crystalline polyolefin carrier resin and an additive package comprising a product of a reaction of an acidic condensation catalyst and a secondary diarylamine. A moisture-curable polyolefin composition comprising the additive masterbatch composition and a (hydrolyzable silyl group)-functional polyolefin prepolymer. A method of making the compositions; a moisture-cured polyolefin composition prepared therefrom; a manufactured article comprising or made from the formulation; and a method of using the manufactured article.

13 Claims, No Drawings

(56) References Cited

U.S. PATENT DOCUMENTS

| | | |
|---|---|---|
| 2008/0251273 A1 | 10/2008 | Brown et al. |
| 2011/0259464 A1 | 10/2011 | Lacroix et al. |
| 2012/0101209 A1 | 4/2012 | Khanna et al. |
| 2015/0004343 A1 | 1/2015 | Levchick et al. |

FOREIGN PATENT DOCUMENTS

| | | |
|---|---|---|
| EP | 1072644 | 1/2001 |
| EP | 1254923 B1 | 5/2001 |
| EP | 1433811 A2 | 6/2004 |
| EP | 1849816 B1 | 4/2006 |
| EP | 1433811 B1 | 2/2007 |
| EP | 2889323 | 7/2015 |
| WO | 2000037552 | 6/2000 |
| WO | 2004087805 | 10/2004 |
| WO | 2005003199 | 1/2005 |
| WO | 2006017391 A3 | 6/2006 |
| WO | 2006101754 | 9/2006 |
| WO | 2012094395 A2 | 7/2012 |
| WO | 2014014648 A2 | 1/2014 |
| WO | 2015149634 | 10/2015 |
| WO | 2015200015 | 12/2015 |
| WO | 2016142544 | 9/2016 |

OTHER PUBLICATIONS

Mcneill, I.C., et al., "Structure and Stability of Halogenated Polymers: Part 4—Chain Brominated Polystyrene," Polymer Degradation and Stability, 1989, p. 1-9, v. 25, No. 1, Elsevier.

* cited by examiner

SEMI-CRYSTALLINE POLYOLEFIN-BASED ADDITIVE MASTERBATCH COMPOSITION

FIELD

The field includes a semi-crystalline polyolefin-based additive masterbatch composition, moisture curable polyolefin compositions prepared therewith, methods of making and using same, and articles containing or made from same.

INTRODUCTION

A masterbatch generally is a solid or liquid additive for imparting color (color masterbatch) or other properties (additive masterbatch) to a host material, typically a host polymer. The masterbatch contains a carrier resin and a pigment (color masterbatch) or one or more additives (additive masterbatch). To make a final product, a masterbatch is mixed or blended with a host material to give the final product. The concentration of colorant in the color masterbatch and the concentration(s) of the one or more additives in the additive masterbatch are typically much higher than target concentration(s) thereof in the final product. To make a polyolefin product, a solid masterbatch, usually in the form of granules or pellets, is mixed (e.g., blended) with a solid host polymer, usually in the form of granules or pellets, and the resulting mixture is melted or extruded to make a polyolefin product. Low density polyethylene (LDPE), ethylene/vinyl acetate (EVA) copolymer or ethylene/ethyl acrylate (EEA) copolymer is typically used as a carrier resin for solid masterbatches used to make polyolefin products.

U.S. Pat. No. 6,936,655 B2 to J. S. Borke et al. relates to crosslinkable flame retardant wire and cable compositions having improved abrasion resistance. The compositions are comprised of a high density silane-containing polyethylene base resin which can be a blend of a bimodal HDPE and ethylene-silane copolymer or silane-grafted bimodal HDPE in combination with a flame retardant and silanol condensation catalyst.

EP 2 889 323 A1 to S. Deveci et al. relates to a polymer composition comprising carbon black and a carrier polymer for the carbon black. A masterbatch comprising, preferably consisting of, (I) 20-50 wt % pigment based on the total amount of the masterbatch (100 wt %); (II) at least 40 wt % of at least one carrier polymer which is a multimodal high density polyethylene (HDPE) having an MFR$_2$ of 1 to 20 g/10 min, a density of 940 to 965 kg/m$^3$ (pref 950 to 960) and a Mw/Mn of 5.5 to 20; and (IV) optionally further additives.

US 2008/0176981 A1 to M. Biscoglio et al. (BISCOGLIO) relates to a moisture-crosslinkable polymeric composition comprising (a) a silane-functionalized olefinic polymer, (b) an acidic silanol condensation catalyst, and (c) a secondary-amine-containing antioxidant composition. The antioxidant composition can be (1) a secondary amine substituted with two aromatic groups or (2) a combination of a first antioxidant and a secondary amine antioxidant substituted with at least one aromatic group. The moisture-crosslinkable polymeric composition can be used for making fibers, films, pipes, foams, and coatings. The compositions may be applied as a coating over a wire or a cable.

BISCOGLIO's moisture crosslinkable polymeric composition is prepared from a 2-part formulation consisting of an additive package in one part and the (a) silane-functionalized olefinic polymer, such as DFDB-5451 ethylene/silane copolymer, in another part [0037]. The additive package contains, among other constituents, a blended carrier resin of a low density polyethylene, such as the linear low density polyethylene DFH-2065, and an ethylene/ethyl acrylate copolymer, such as DPDA-6182, the (b) acidic silanol condensation catalyst, such as a sulfonic acid, and the (c) secondary amine [0037], [0038] and Table 1. The (c) secondary amine may be substituted with two aromatic groups [0005]. The DFDB-5451 is a host polymer that contains moisture curable silane groups. The moisture crosslinkable polymeric composition is prepared by extruding the additive package at 5 wt % into the DFDB-5451 [0037]. The moisture crosslinkable polymeric composition may be cured with water such as by exposing the composition at 23° C. and 70% relative humidity for two days [0039].

SUMMARY

We (the present inventors) have discovered that standard additive masterbatch compositions that employ carrier resins composed of LDPE or EEA or EVA copolymers suffer from phase separation and exudation of certain additives therefrom. For example, an acid catalyst and an amine antioxidant may react to form a product that phase-separates and exudes from their composition. When the composition is pelletized, the pellets agglomerate. These sticky pellets cause handling problems making conveying sticky pellets difficult and cause manufacturing problems when using sticky pellets that lead to extruder screw slipping, formation of crystalline contaminants, build-up of material on processing equipment over time, and sluffing off of exuded additive on processing equipment.

We conceived a technical solution to this problem that inhibits or prevents phase separation or exudation of additive components. The solution includes a semi-crystalline polyolefin-based additive masterbatch composition, as well as a moisture curable polyolefin composition prepared therewith, methods of making and using same, and articles containing or made from same.

DETAILED DESCRIPTION

The Summary and Abstract are incorporated here by reference. Examples of embodiments include the following numbered aspects.

Aspect 1. An additive masterbatch composition comprising (A) a semi-crystalline polyolefin carrier resin and an additive package comprising a product of a reaction of (B) an acidic condensation catalyst and (C) a secondary diarylamine of formula (I): (R$^1$—Ar)$_2$NH (I), wherein each Ar is benzene-1,4-diylor both Ar are bonded to each other and taken together with the NH of formula (I) constitute a carbazol-3,6-diyl; and each R$^1$ is independently (C$_1$-C$_{20}$) hydrocarbyl; wherein (A) is 50 to 99 weight percent (wt %) and the additive package is from 1 to 50 wt % of total weight (100.00 wt %) of the additive masterbatch composition.

Aspect 2. The additive masterbatch composition of aspect 1 wherein the (A) semi-crystalline polyolefin carrier resin consists essentially of, alternatively consists of: (i) a semi-crystalline medium density polyethylene; (ii) a semi-crystalline high density polyethylene; (iii) a semi-crystalline polypropylene; (iv) a semi-crystalline ethylene/propylene copolymer; (v) a semi-crystalline poly(ethylene-co-alpha-olefin) copolymer; (vi) a combination (e.g., mixture or blend) of any two or more of (i), (ii) and (v); (vii) the (A) semi-crystalline polyolefin carrier resin has a crystallinity of 50 to <100 wt %, alternatively 55 to <100 wt %, alternatively 60 to <100 wt %, alternatively 65 to <100 wt %; or (viii) any one of limitations (i) to (vi) and the (A) semi-crystalline polyolefin carrier resin has a crystallinity of 50 to <100 wt %, alternatively 55 to <100 wt %, alternatively 60 to <100 wt %, alternatively 65 to <100 wt %. Aspect 2 is any one of (i) to (viii).

Aspect 3. The additive masterbatch composition of aspect 1 or 2 wherein the (A) semi-crystalline polyolefin carrier resin has (i) a density of at least 0.925 g/cm$^3$ and is a polyethylene or a density of 0.89 to 0.90 g/cm$^3$ and is a polypropylene; (ii) a crystallinity of 50 to <100 wt % and is a polyethylene; (iii) a melt flow index (MFI) of 0.1 to 20 grams per 10 minutes (g/10 min.) at 190° C./2.16 kg load and is a polyethylene or a melt flow rate (MFR) of 0.5 to 50 g/10 min. at 230 C./2.16 kg load and is a polypropylene; (iv) a molecular weight distribution (MWD) that is monomodal; (v) a MWD that is bimodal; (vi) both (i) and (ii); (vii) both (i) and (iii); (viii) both (ii) and (iii); (ix) both (iv) and at least one of (i) to (iii); or (x) both (v) and at least one of (i) to (iii). Aspect 3 is any one of (i) to (x).

Aspect 4. The additive masterbatch composition of any one of aspects 1 to 3 wherein: (i) the product of a reaction of (B) and (C) comprises a salt formed by an acid/base reaction of (B) and (C); (ii) the additive package further comprises unreacted (B) but not unreacted (C); (iii) the additive package further comprises unreacted (C) but not unreacted (B); or (iv) the additive package further comprises unreacted (B) and unreacted (C). Aspect 4 is any one of (i) to (iv). In some aspects at least 50 wt %, alternatively at least 75 wt %, alternatively at least 90 wt % of the combined weight of (B) and (C) is the product of a reaction of (B) and (C). Aspect 4 is any one of (i) to (iv).

Aspect 5. The additive masterbatch composition of any one of aspects 1 to 4 wherein the (B) acidic condensation catalyst is (i) an organosulfonic acid, an organophosphonic acid, or a hydrogen halide; (ii) an organosulfonic acid; (iii) an alkyl-substituted arylsulfonic acid; (iv) an alkyl-substituted arylsulfonic acid wherein there is/are 1 or 2 ($C_5$-$C_{20}$) alkyl substituent(s) and 1 aryl group that is phenyl or naphthyl; (v) a ($C_1$-$C_5$)alkylphosphonic acid, wherein the ($C_1$-$C_5$)alkyl is unsubstituted or substituted with one —$NH_2$ group; (vi) HF, HCl, or HBr; or (vii) a combination of any two or more of (i) to (vi). Aspect 5 is any one of (i) to (vii).

Aspect 6. The additive masterbatch composition of any one of aspects 1 to 5 further comprising at least one additive selected from: (D) one or two second antioxidants, each having a structure different than formula (I) and each other; (E) a processing aid; (F) a colorant; (G) a metal deactivator; (H) an (unsaturated carbon-carbon bond)-free hydrolyzable silane; (I) a corrosion inhibitor; and (J) a combination of any two or more of additives (D) to (I).

Aspect 7. A moisture-curable polyolefin composition comprising the additive masterbatch composition of any one of aspects 1 to 6 and a (hydrolyzable silyl group)-functional polyolefin prepolymer; wherein in the (hydrolyzable silyl group)-functional polyolefin prepolymer: (i) each hydrolyzable silyl group is independently a monovalent group of formula (II): $(R^2)_m(R^3)_{3-m}Si$— (II); wherein subscript m is an integer of 1, 2, or 3; each $R^2$ is independently H, HO—, ($C_1$-$C_6$)alkoxy, ($C_2$-$C_6$)carboxy, (($C_1$-$C_6$)alkyl)$_2$N—, ($C_1$-$C_6$)alkyl(H)C=NO—, or (($C_1$-$C_6$)alkyl)$_2$C=NO—; and each $R^3$ is independently ($C_1$-$C_6$)alkyl or phenyl; (ii) the polyolefin is polyethylene based, poly(ethylene-co-($C_3$-$C_{40}$) alpha-olefin)-based, or a combination thereof; or (iii) both (i) and (ii). Aspect 7 is any one of (i) to (iii).

Aspect 8. A method of making a moisture-curable polyolefin composition, the method comprising mixing a (hydrolyzable silyl group)-functional polyolefin prepolymer and a divided solid form of the additive masterbatch composition of any one of aspects 1 to 6 so as to give a mixture; and melting or extruding the mixture so as to make the moisture-curable polyolefin composition.

Aspect 9. A moisture-cured polyolefin composition that is a product of moisture curing the moisture curable polyolefin composition of aspect 7, or the composition made by the method of aspect 8, to give the moisture-cured polyolefin composition.

Aspect 10. A manufactured article comprising a shaped form of the moisture-cured polyolefin composition of aspect 9.

Aspect 11. A coated conductor comprising a conductive core and a polymeric layer at least partially surrounding the conductive core, wherein at least a portion of the polymeric layer comprises the moisture-cured polyolefin composition of aspect 9.

Aspect 12. A method of conducting electricity, the method comprising applying a voltage across the conductive core of the coated conductor of aspect 11 so as to generate a flow of electricity through the conductive core.

Additive masterbatch composition. The additive masterbatch composition may contain at least 55 wt %, alternatively at least 70 wt %, alternatively at least 80 wt %, alternatively at least 90 wt % of the (A) semi-crystalline polyolefin carrier resin; all based on total weight of the additive masterbatch composition. The additive masterbatch composition may be free of: (i) an ethylene/silane copolymer, (ii) an ethylene/vinyl acetate (EVA) copolymer, (iii) an ethylene/alkyl acrylate copolymer (e.g., EEA copolymer), (iv) carbon black; (v) a pigment or colorant; (vi) a filler; (vii) a flame retardant; or (viii) any two, alternatively any six of (i) to (vii). The additive masterbatch composition may have from >0 to 5 wt % of any other carrier resin, alternatively the additive masterbatch composition may be free of any carrier resin other than the (A) semi-crystalline polyolefin carrier resin.

The additive masterbatch composition may further comprise the (F) colorant and may be characterized as a color masterbatch composition. The (F) colorant may be a pigment (e.g., carbon black or titanium dioxide), a dye, or a phosphor; alternatively titanium dioxide or a phosphor. The color masterbatch composition may be free of a HDPE.

The additive masterbatch composition may further comprise a flame retardant and may be characterized as a flame retardant masterbatch composition. The flame retardant may be decabromodiphenyl ether; decabromodiphenylethane; a brominated organic polymer; antimony trioxide (a flame retardant synergist); aluminum trihydroxide; magnesium hydroxide; N,N'-ethylenebis(3,4,5,6-tetrabromophthalimide); a flame retardant silicone; or a combination of any two or more thereof. Examples of the brominated organic polymer are a brominated polystyrene; a brominated rubber a poly(vinyl bromide); a poly(vinylidene bromide); a poly(brominated-alkyl acrylate); a poly(alkyl brominated-acrylate); and a brominated butadiene-styrene copolymer. Examples of the brominated polystyrene are poly(4-bromostyrene) and poly(bromostyrene). Examples of the brominated rubber are brominated natural rubber and brominated synthetic organic rubber. Examples of the poly(brominated-alkyl acrylate) are a poly(2-bromoethyl methacrylate) and a poly(2,3-dibromopropyl methacrylate. An example of the poly(alkyl brominated-acrylate) is a poly(methyl-alpha-bromoacrylate). Examples of the flame retardant silicone are flame retardant silicone rubber, DOW CORNING 11-100 Additive, and DOW CORNING 4-7081 Resin Modifier. Alternatively the flame retardant masterbatch composition may be free of a HDPE. A flame retardant synergist is an additive that enhances (increases) flame retarding properties of a mineral flame retardant. Flame retardant synergist are useful as additives in wire and cable insulation formulations.

The additive masterbatch composition may further comprise a filler and may be characterized as a filler masterbatch composition. The filler may be calcium carbonate, zinc borate, zinc molybdate, zinc sulfide, carbon black, talc, magnesium oxide, zinc oxide, or a clay. Alternatively, the filler masterbatch composition may be free of a HDPE.

Alternatively, the additive masterbatch composition may be free of (i) (F) colorant, (ii) flame retardant, (iii) filler, (iv) both (i) and (ii), (v) both (i) and (iii), or (vi) both (ii) and (iii).

Constituent (A) semi-crystalline polyolefin carrier resin. The semi-crystalline polyolefin carrier resin may be a semi-crystalline polyethylene that is a semi-crystalline medium density polyethylene (MDPE), a semi-crystalline high density polyethylene (HDPE), or a combination thereof.

The (A) semi-crystalline polyolefin carrier resin may have a density of at least 0.925 g/cm$^3$, alternatively at least 0.930 g/cm$^3$, alternatively at least 0.935 g/cm$^3$, alternatively at least 0.940 g/cm$^3$. The semi-crystalline HDPE may have a maximum density of 0.970 g/cm$^3$, alternatively at most 0.960 g/cm$^3$, alternatively at most 0.950 g/cm$^3$. The semi-crystalline HDPE may have a density of from 0.930 to 0.970 g/cm$^3$, alternatively 0.935 to 0.965 g/cm$^3$. The density of the (A) may be measured by ASTM D-1505, Test Method for Density of Plastics by the Density-Gradient Technique.

The (A) semi-crystalline polyolefin carrier resin may have a crystallinity of at least 55 wt %, alternatively at least 58 wt %, alternatively at least 59 wt %. In any one of the immediately preceding aspects the crystallinity may be at most 90 wt %, alternatively at most 80 wt %, alternatively at most 78 wt %. In some aspects the crystallinity is from 55 to 80 wt %, alternatively from 58 to 78 wt %, alternatively from 58 to 76 wt %, alternatively from 62 to 78 wt %, alternatively any one of 59±1 wt %, 62±1 wt %, 76±1 wt %, and 77±1 wt %. The crystallinity of a semi-crystalline polyolefin resin, such as (A) semi-crystalline polyolefin carrier resin, may be determined by differential scanning calorimetry (DSC) according to ASTM D3418-15 or the Crystallinity Test Method described later. For a semi-crystalline polyethylene resin, wt % crystallinity=($\Delta H_f$*100%)/292 J/g. For a semi-crystalline polypropylene resin, wt % crystallinity=($\Delta H_f$*100%)/165 J/g. In the respective equations $\Delta H_f$ is the second heating curve heat of fusion for the polyethylene resin or polypropylene resin, as the case may be, * indicates mathematical multiplication, / indicates mathematical division, 292 J/g is a literature value of the heat of fusion ($\Delta H_f$) for a 100% crystalline polyethylene, and 165 J/g is a literature value of the heat of fusion ($\Delta H_f$) for a 100% crystalline polypropylene. Preferably, crystallinity is determined by DSC according to the Crystallinity Test Method described later.

The (A) semi-crystalline polyolefin carrier resin may have a melt flow index (MFI) of 10 to 20 g/10 min., alternatively 0.1 to 10 g/10 min., alternatively 0.20 to 9 g/10 min. The MFI may be determined by ASTM D1238 (2.16 kilograms (kg), 190° C.).

The (A) semi-crystalline polyolefin carrier resin may be characterized by a molecular weight distribution (MWD) that is monomodal, alternatively bimodal.

The (A) semi-crystalline polyolefin carrier resin may be a semi-crystalline HDPE that is bimodal and has a density of from 0.950 to 0.958 g/cm$^3$ and a MFI from 0.20 to 0.40 g/10 min. The (A) semi-crystalline polyolefin carrier resin may be a semi-crystalline HDPE that is monomodal and has a density of from 0.930 to 0.970 g/cm$^3$ and a MFI of from 0.65 to 9 g/10 min., alternatively a density from 0.935 to 0.965 g/cm$^3$ and a MFI from 0.7 to 8.5 g/10 min.

Constituent (B) acidic condensation catalyst. The (B) acidic condensation catalyst is suitable for condensation curing the hydrolyzable silyl groups of the (A) (hydrolyzable silyl group)-functional polyolefin prepolymer. The (B) may be a Lewis acid, alternatively a Brønsted acid, alternatively a combination of a Lewis acid and a Brønsted acid. As used herein "Lewis acid" means a molecule or ion that is an electron pair acceptor in neutral water to give a potential of hydrogen (pH) of 6.9 or lower. As used herein "Brønsted acid" means a molecule that is a proton (H$^+$) donor in neutral water to give a potential of hydrogen (pH) of 6.9 or lower. In some aspects (B) is any one of Lewis acids (i) to (v): (i) a transition metal-carboxylate compound or a transition metal-halide compound, wherein the transition metal is an element of any one of Groups 3 to 13 of the Periodic Table of the Elements and each halide is Cl or Br; (ii) the transition metal-carboxylate compound; (iii) the transition metal-carboxylate compound wherein the transition metal is tin, zinc, copper, iron, lead, or titanium; (iv) the transition metal-carboxylate compound wherein each carboxylate independently is a $(C_1$-$C_{30})$alkylcarboxylate, alternatively a $(C_5$-$C_{30})$alkylcarboxylate, alternatively a $(C_{10}$-$C_{30})$alkylcarboxylate, alternatively a $(C_{10}$-$C_{20})$alkylcarboxylate, alternatively a $(C_{10}$-$C_{18})$alkylcarboxylate; and (v) dibutyltin dilaurate. Although (B) may be a Lewis acid, typically (B) is a Brønsted acid, such as described previously herein. Constituent (B) may be present in the moisture-curable polyolefin composition at a concentration from 0.01 to 0.50 wt %, alternatively at least 0.05 wt %, alternatively at least 0.10 wt %; and alternatively at most 0.3 wt %, alternatively at most 0.2 wt %; all based on total weight of the moisture-curable polyolefin composition. In some aspects (B) is the organosulfonic acid. Examples of suitable organosulfonic acids are 4-methylphenylsulfonic acid, dodecylbenzenesulfonic acid, alkylnaphthylsulfonic acids, and organosulfonic acids in WO 2006/017391; EP 0736065; and U.S. Pat. No. 6,441,097.

Constituent (C) secondary diarylamine of formula (I): $(R^1$—$Ar)_2NH$ (I), wherein Ar and $R^1$ are as defined above. In some aspects the (C) secondary diarylamine of formula (I): (i) each Ar is benzene-1,4-diyl; (ii) both Ar are bonded to each other and taken together with the NH of formula (I) constitute a carbazol-3,6-diyl; (iii) each $R^1$ is independently $(C_1$-$C_{10})$hydrocarbyl; (iv) each $R^1$ is independently $(C_7$-$C_{20})$hydrocarbyl; (v) each $R^1$ is independently benzyl, 1-phenylethyl, or 1-methyl-1-phenylethyl; (vi) 1-methyl-1-phenylethyl; (vii) both (i) and any one of (iii) to (vi); or (viii) both (ii) and any one of (iii) to (vi).

Examples of suitable constituent (C) are 3,6-dibenzylcarbazole; bis(4-benzylphenyl)amine, bis(4-(1-phenylethyl)phenyl)amine, and bis(4-(1-methyl-1-phenylethyl)phenyl) amine. In some aspects of the moisture-curable polyolefin composition, the concentration of constituent (C) is greater than, alternatively at least 1.1 times (1.1×) greater than, alternatively at least 1.2×greater than, alternatively at least 1.3×greater than the concentration of constituent (B). In such aspects of the moisture-curable polyolefin composition, the concentration of constituent (C) is less than 1.6×, alternatively less than 1.5×, alternatively less than 1.4× the concentration of constituent (B).

Additive (D) one or two second antioxidants, each having a structure different than formula (I) and each other. In some aspects additive (D) is 1 second antioxidant. In other aspects additive (D) is two second antioxidants. Examples of suitable second antioxidants are polymerized 1,2-dihydro-2,2, 4-trimethylquinoline (Agerite MA); tris(4-tert-butyl-3-hydroxy-2,6-dimethylbenzyl)-s-triazine-2,4,6-(1H,3H,5H) trione (Cyanox 1790); distearyl-3,3-thiodiproprionate (DSTDP); tetrakismethylene (3,5-di-tert-butyl-4-hydroxy-hydrocinnamate) methane (Irganox 1010); 1,2-bis(3,5-di-tert-butyl-4-hydroxyhydrocinnamoyl)hydrazine (Irganox 1024); bis(4,6-dimethylphenyl)isobutylidene (Lowinox 221646); and 4,4-thiobis(2-tert-butyl-5-methylphenol) (TBM6).

Additive (E) processing aid. Additive (E) may improve flow of a melt of the additive masterbatch composition through a machine. (E) may be an organic processing aid such as a fluoropolymer or a silicone processing aid such as a polyorganosiloxane or fluoro-functionalized polyorganosiloxane. The additive (E) may be used at a concentration of from 1 to 20 wt %, alternatively 2 to 18 wt %, alternatively 3 to 15 wt %, based on total weight of the additive masterbatch composition.

Additive (F) a colorant. E.g., a pigment or dye. E.g., carbon black or titanium dioxide. The carbon black may be provided as a carbon black masterbatch that is a formulation of poly(1-butene-co-ethylene) copolymer (from 95 wt % to <100 wt % of the total weight of the masterbatch) and carbon black (from >0 wt % to 5 wt % of the total weight of the masterbatch. The (F) colorant may be from 0.1 to 35 wt %, alternatively 1 to 10 wt %, based on total weight of the moisture-curable polyolefin composition.

Additive (G) a metal deactivator. E.g., oxaylyl bis(benzylidene hydrazide) (OABH). Additive (G) may be from 0.001 to 0.2 wt %, alternatively 0.01 to 0.15 wt %, alternatively 0.01 to 0.10 wt %, all based on total weight of the moisture-curable polyolefin composition.

Additive (H) (unsaturated carbon-carbon bond)-free hydrolyzable silane. Additive (H) may be any monosilane containing at least 1, alternatively at least 2, alternatively at least 3, alternatively 4 hydrolyzable groups (e.g., $R^2$ as defined above); and at most 3, alternatively at most 2, alternatively at most 1, alternatively 0 non-hydrolyzable (unsaturated carbon-carbon bond)-free groups such as alkyl or aryl groups. Examples of (H) are acetoxytrimethylsilane, 4-benzylphenylsulfonoxytributylsilane, dimethylaminomethoxy-dioctylsilane, octyltrimethoxysilane, and tetramethoxysilane. Additive (H) may be from 0.1 to 2 wt %, alternatively 0.1 to 1.5 wt %, alternatively 0.1 to 1.0 wt %; all based on total weight of the moisture-curable polyolefin composition.

Additive (I) a corrosion inhibitor. E.g., tin (II) sulfate. Additive (I) may be from 0.00001 to 0.1 wt %, alternatively 0.0001 to 0.01 wt %, based on total weight of the moisture-curable polyolefin composition.

The additive masterbatch composition may further comprise other additives selected from a lubricant and an anti-blocking agent.

In some aspects the additive masterbatch composition may comprise carrier resin (A) and an additive package comprising (B) and (C), or a product of a reaction of (B) and (C); (D) one or two second antioxidants; and (G).

Moisture-curable polyolefin composition. The total weight of all constituents and additives in the moisture-curable polyolefin composition is 100.00 wt %. The moisture-curable polyolefin composition may further comprise water. The additive masterbatch composition may be at a concentration of from 0.1 to 10 wt %, alternatively from 0.5 to 7 wt %, alternatively from 1 to 6 wt %, of the moisture-curable polyolefin composition; all based on total weight of the moisture-curable polyolefin composition.

The moisture-curable polyolefin composition may be a one-part formulation, alternatively a two-part formulation. The two-part formulation may comprise first and second parts, wherein the first part consists essentially of a (hydrolyzable silyl group)-functional polyolefin prepolymer; wherein the second part consists essentially of the additive masterbatch composition.

In some aspects of the moisture-curable polyolefin composition, the divided solid form of the additive master batch composition may comprise granules and/or pellets. Prior to the mixing step used to prepare the moisture-curable polyolefin composition, the (hydrolyzable silyl group)-functional polyolefin prepolymer also may be in a divided solid form (e.g., granules or pellets).

In some aspects of the moisture-curable polyolefin composition, the amount of the additive masterbatch composition used may be such that the constituent (C), or the ad rem portion of the product of reaction prepared from (B) and (C), is (i) from >0.200 weight percent (wt %) to 0.500 wt %; (ii) from 0.220 wt % to 0.500 wt %, (iii) from 0.250 wt % to 0.50 wt %, or (iv) from 0.220 wt % to 0.400 wt %; all based on total weight of the moisture-curable polyolefin composition.

The (hydrolyzable silyl group)-functional polyolefin prepolymer ("Host Polymer"). The polyolefin of the Host Polymer may be polyethylene based, which means that the prepolymer has a backbone formed by polymerization of ethylene. Alternatively, the Host Polymer may be poly (ethylene-co-($C_3$-$C_{40}$)alpha-olefin)-based, which means that the prepolymer has a backbone formed by copolymerization of ethylene and at least one alpha-olefin. Host Polymer may be a reactor copolymer of ethylene and an alkenyl-functional hydrolyzable silane. The alkenyl-functional hydrolyzable silane may be of formula (III) $(R^2)_m(R^3)_{3-m}Si—(C_2-C_6)$ alkenyl (III), wherein m, $R^2$, and $R^3$ are as defined above for formula (II). The ($C_2$-$C_6$)alkenyl may be vinyl, allyl, 3-butenyl, or 5-hexenyl. In some aspects the Host Polymer is a reactor copolymer of ethylene and vinyltrimethoxysilane. Vinyltrimethoxysilane is an example of the alkenyl-functional hydrolyzable silane of formula (III) wherein subscript m is 3, each $R^2$ is a ($C_1$-$C_6$)alkoxy, specifically methoxy; and the ($C_2$-$C_6$)alkenyl is vinyl (—C(H)=$CH_2$). Alternatively, Host Polymer may be a reactor copolymer of ethylene, an alpha-olefin, and the alkenyl-functional hydrolyzable silane, such as in U.S. Pat. No. 6,936,671. Alternatively, Host Polymer may be a homopolymer of ethylene having a carbon atom backbone having the hydrolyzable silyl groups grafted thereonto, such as a polymer made by a process (e.g., a SIOPLAS™ process) comprising reactively grafting a hydrolyzable unsaturated silane (e.g., vinyltrimethoxysilane) in a post-polymerization compounding or extruding step, typically facilitated by a free radical initiator such as a dialkyl peroxide, and isolating the resulting silane-grafted polymer. The grafted polymer may be for used in a subsequent fabricating step. Alternatively, Host Polymer may be a copolymer of ethylene and one or more of ($C_3$-$C_{40}$)alpha-olefins and unsaturated carboxylic esters (e.g., (meth)acrylate alkyl esters), wherein the copolymer has a backbone having the hydrolyzable silyl groups grafted thereonto, such as made by a SIOPLAS™ process. Alternatively, Host Polymer may be a mixture of ethylene, a hydrolyzable silane such as the alkenyl-functional hydrolyzable silane of formula (III), and a peroxide suitable for use in a process (e.g., a MONOSIL™ process) comprising reactively grafting a hydrolyzable unsaturated silane (e.g., vinyltrimethoxysilane) in a post-polymerization compounding or extruding step, typically facilitated by a free radical initiator such as a dialkyl peroxide, and using the resulting silane-grafted polymer immediately (without isolation) in a subsequent fabricating step. Alternatively, Host Polymer may be a mixture of a copolymer of ethylene and one or more of ($C_3$-$C_{40}$)alpha-olefins and unsaturated carboxylic esters, a hydrolyzable silane such as the alkenyl-functional hydrolyzable silane of formula (III), and a peroxide, suitable for use in a SIOPLAS™ or MONOSIL™ process. The alpha-olefin may be a ($C_3$-$C_{40}$)alpha-olefin, alternatively a ($C_3$-$C_{20}$)alpha-olefin, alternatively a ($C_3$-$C_{10}$)alpha-olefin. The alpha-olefin may have at least four carbon atoms (i.e., be a ($C_4$)alpha-olefin or larger). Examples of the ($C_3$-$C_{10}$)alpha-olefin are propylene, 1-butene, 1-hexene, 1-octene, and 1-decene. The peroxide may be an organic peroxide such as described in WO 2015/149634 A1, page 5, line 6, to page 6, line 2. The organic peroxide, when present, may be used at a concentration of from 0.02 to 2 wt %, alternatively 0.04 to 2 wt %, alternatively 0.04 to 1 wt %, alternatively 0.04 to 0.08 wt %, based on total weight of the moisture-curable polyolefin composition. Host Polymer may be present in the moisture-curable polyolefin composition at a concentration from 40 to 99.78 wt %, alternatively at least 50 wt %, alternatively at least 60 wt %; and alternatively at most 99 wt %, alternatively at most 95 wt %, alternatively at most 80 wt %; all based on total weight of the moisture-curable polyolefin composition.

The (hydrolyzable silyl group)-functional polyolefin prepolymer (Host Polymer) may be: (i) a reactor copolymer of ethylene and a hydrolyzable silane; (ii) a reactor copolymer of ethylene, a hydrolyzable silane, and one or more alpha-olefins and unsaturated carboxylic esters (e.g., U.S. Pat. No. 6,936,671); (iii) a homopolymer of ethylene having a carbon backbone and a hydrolyzable silane grafted to the carbon backbone (e.g., made by the SILOPAS™ process); (iv) a copolymer of ethylene, one or more alpha-olefins and unsaturated carboxylic esters, having backbone and a hydrolyzable silane grafted to its backbone (e.g., made by the SILOPAS™ process); (v) a copolymer formed from a mixture of ethylene, hydrolyzable silane, and organic peroxide (e.g., made by the MONOSIL™ process); or (vi) a copolymer formed from a mixture of ethylene, and one or more alpha-olefins and unsaturated carboxylic esters, a hydrolyzable silane, and an organic peroxide (e.g., made by the MONOSIL™ process).

The additive masterbatch and moisture-curable polyolefin compositions may be referred to as unfilled compositions when fillers are absent therefrom. Aspects of the unfilled composition may be made by any suitable means. For example, an unfilled additive masterbatch composition that contains constituent (A) and the additive package comprising a product of a reaction of (B) and (C), but does not contain filler, may be made in a Brabender batch mixer by blending the constituents for 3 minutes at 180° C. melt temperature using cam blades at 30 rotations per minute (rpm) to give an unfilled melt mixture, and then allowing the unfilled melt mixture to cool to give the embodiments of the unfilled composition.

The filler additive masterbatch composition and moisture-curable polyolefin composition prepared therefrom may be referred to as filled compositions. Embodiments of the filled compositions may also be made by any suitable means. For example, embodiments of the filled additive masterbatch composition may be made in a Brabender batch mixer using 180° C. melt temperature by first adding the constituents (A) and (B), and (C) into the mixer. Once the constituents (A) to (C) have started melting, then add a filler, and optionally zero, one or more of additives(s) (D) one or two second antioxidants, followed by any other additives (E), (F), (G), (H), and/or (I), at flux to give a filled melt mixture. Then homogenize the filled melt mixture for about 3 minutes, and allow the filled melt mixture to cool to give the embodiments of the filler additive masterbatch composition.

Test samples of embodiments of unfilled and filled compositions may be separately made into compression molded plaques. The mechanical properties of these compositions may be characterized using test samples cut from the compression molded plaques.

Any compound herein includes all its isotopic forms, including natural abundance forms and/or isotopically-enriched forms. The isotopically-enriched forms may have additional uses, such as medical or anti-counterfeiting applications, wherein detection of the isotopically-enriched form is helpful in treatment or investigation.

The following apply unless indicated otherwise. Alternatively precedes a distinct embodiment. ASTM means the standards organization, ASTM International, West Conshohocken, Pa., USA. IEC means the standards organization, International Electrotechnical Commission, Geneva, Switzerland. Any comparative example is used for illustration purposes only and shall not be prior art. Free of or lacks means a complete absence of; alternatively not detectable. IUPAC is International Union of Pure and Applied Chemistry (IUPAC Secretariat, Research Triangle Park, N.C., USA). May confers a permitted choice, not an imperative. Operative means functionally capable or effective. Optional(ly) means is absent (or excluded), alternatively is present (or included). PPM are weight based. Properties are measured using a standard test method and conditions for the measuring (e.g., viscosity: 23° C. and 101.3 kPa). Ranges include endpoints, subranges, and whole and/or fractional values subsumed therein, except a range of integers does not include fractional values. Room temperature: 23° C.±1° C. Substituted when referring to a compound means having, in place of hydrogen, one or more substituents, up to and including per substitution.

Advantageously we discovered that the additive masterbatch composition and moisture-curable polyolefin composition prepared therewith does not become sticky. Pellets thereof do not agglomerate and become difficult to use in extrusions. Pellets may be handled and conveyed readily and extruded without or with reduced amount of extruder screw slipping, formation of crystalline contaminants, build-up of material on processing equipment over time, and/or sluffing off of exuded additive on processing equipment. The moisture-cured polyolefin composition has satisfactory extent of crosslinking and has good heat aging performance under several different test conditions. Also, the moisture-cured polyolefin composition has good mechanical properties such as tensile strength and elongation-at-break. The additive masterbatch composition inhibits or prevents moisture pick-up and premature curing of moisture curable polyolefin compositions and/or decomposition of moisture-sensitive additives. The additive masterbatch composition may also inhibit or prevent phase separation or exudation of additive components. These characteristics make the moisture-cured polyolefin composition useful in a variety of applications including as a component of a coating of a coated conductor such as a coated wire or coated cable.

Additive Masterbatch Composition Preparation Methods. Melt blend constituents of the additive masterbatch compositions (of comparative and inventive examples) either in a Banbury compounder using a compounding temperature of 155° C., rotor speed of 60 to 65 rotations per minute (rpm) or in a ZKS twin-screw extruder using an extrusion temperature of 160° C. and a screw speed of 200 rpm. All resulting additive masterbatch compositions were dried at 70 C. for 24 hours before being used to prepare coated conductors.

Crystallinity Test Method. For determining crystallinity in wt % of a semi-crystalline polyolefin such as (A) semi-crystalline polyolefin carrier resin. Determine melting peaks and weight percent (wt %) crystallinity using DSC instrument DSC Q1000 (TA Instruments) as follows. (A) Baseline calibrate instrument. Use software calibration wizard. First obtain a baseline by heating a cell from −80° to 280° C. without any sample in an aluminum DSC pan. Then use sapphire standards as instructed by the calibration wizard. The analyze 1 to 2 milligrams (mg) of a fresh indium sample by heating the standards sample to 180° C., cooling to 120° C. at a cooling rate of 10° C./minute, then keeping the standards sample isothermally at 120° C. for 1 minute, followed by heating the standards sample from 120° to 180° C. at a heating rate of 10° C./minute. Determine that indium standards sample has heat of fusion=28.71±0.50 Joules per gram (J/g) and onset of melting=156.6°±0.5° C. Perform DSC measurements on test samples using same DSC instrument. For semi-crystalline polyethylene test samples see procedure (B) below. For semi-crystalline polypropylene test samples see procedure (C) below.

(B) DSC on Semi-crystalline Polyethylene Test Samples. Press test sample of polymer into a thin film at a temperature of 160° C. Weigh 5 to 8 mg of test sample film in DSC pan. Crimp lid on pan to seal pan and ensure closed atmosphere. Place sealed pan in DSC cell, equilibrate cell at 30° C., and heat at a rate of about 100° C./minute to 140° C., keep sample at 140° C. for 1 minute, cool sample at a rate of 10° C./minute to 0° C. or lower (e.g., −40° C.) to obtain a cool curve heat of fusion ($H_f$), and keep isothermally at 0° C. or lower (e.g., −40° C.) for 3 minutes. Then heat sample again at a rate of 10° C./minute to 180° C. to obtain a second heating curve heat of fusion ($\Delta H_f$). Using the resulting curves, calculate the cool curve heat of fusion (J/g) by integrating from the beginning of crystallization to 10° C. Calculate the second heating curve heat of fusion (J/g) by integrating from 10° C. to the end of melting. Measure weight percent crystallinity (wt % crystallinity) of the polymer from the test sample's second heating curve heat of fusion ($\Delta H_f$) and its normalization to the heat of fusion of 100% crystalline polyethylene, where wt % crystallinity= ($\Delta H_f$) 00%)/292 J/g, wherein $\Delta H_f$ is as defined above, * indicates mathematical multiplication, / indicates mathematical division, and 292 J/g is a literature value of heat of fusion ($\Delta H_f$) for a 100% crystalline polyethylene.

(C) DSC on Semi-crystalline Polypropylene Test Samples. Press test sample of polypropylene into a thin film at a temperature of 210° C. Weigh 5 to 8 mg of test sample film in DSC pan. Crimp lid on pan to seal pan and ensure closed atmosphere. Place sealed pan in DSC cell and heat at a rate of about 100° C./minute to 230° C., keep sample at 230° C. for 5 minutes, cool sample at a rate of 10° C./minute to −20° C. to obtain a cool curve heat of fusion, and keep isothermally at −20° C. for 5 minutes. Then heat sample again at a rate of 10° C./minute until melting is complete to obtain a second heating curve heat of fusion (($\Delta H_f$)). Using the resulting curves, calculate the cool curve heat of fusion (J/g) by integrating from the beginning of crystallization to 10° C. Calculate the second heating curve heat of fusion (J/g) by integrating from 10° C. to the end of melting. Measure weight percent crystallinity (wt % crystallinity) of the polymer from the test sample's second heating curve heat of fusion ($\Delta H_f$) and its normalization to the heat of fusion of 100% crystalline polypropylene, where wt % crystallinity=($\Delta H_f$*100%)/165 J/g, wherein $\Delta H_f$ is as defined above, * indicates mathematical multiplication, / indicates mathematical division, and 165 J/g is a literature value of heat of fusion ($\Delta H_f$) for a 100% crystalline polypropylene.

In other aspects the crystallinity is at room temperature of the semi-crystalline polyolefin (e.g., the semi-crystalline medium density polyethylene, semi-crystalline high density polyethylene, or the semi-crystalline poly(ethylene-co-alpha-olefin) copolymer (collectively "semi-crystalline ethylenic (co) polymer")) and is calculated using the following equation.

$$\text{Wt \% crystallinity} = \frac{\rho_c}{\rho}\left(\frac{\rho - \rho_a}{\rho_c - \rho_a}\right),$$

wherein ρ=density of the semi-crystalline ethylenic (co) polymer (g/cm³ at 23 C.), $\rho_a$=density of amorphous fraction (0.855 g/cm³), and $\rho_c$=density of crystalline fraction (1.00 g/cm³). Determine melting peaks and percent (%) or weight percent (wt %) crystallinity of the semi-crystalline ethylenic (co) polymer using Differential Scanning calorimeter (DSC) instrument DSC Q1000 (TA Instruments). First baseline calibrate the DSC instrument and then perform the DSC measurement.

Baseline calibration of DSC instrument. Use software calibration wizard. First obtain a baseline by heating a cell from −80° to 280° C. without any sample in an aluminum DSC pan. Then use sapphire standards as instructed by the calibration wizard. Then analyze 1 to 2 milligrams (mg) of a fresh indium sample by heating the standards sample to 180° C., cooling to 120° C. at a cooling rate of 10° C./minute, then keeping the standards sample isothermally at 120° C. for 1 minute, followed by heating the standards sample from 120° to 180° C. at a heating rate of 10° C./minute. Determine that indium standards sample has heat of fusion=28.71±0.50 Joules per gram (J/g) and onset of melting=156.6°±0.5° C.

Perform DSC measurements on test samples using same DSC instrument. Press test sample of semi-crystalline ethylenic (co) polymer into a thin film at a temperature of 160° C. Weigh 5 to 8 mg of test sample film in DSC pan. Crimp lid on pan to seal pan and ensure closed atmosphere. Place sealed pan in DSC cell, equilibrate cell at 30° C., and heat at a rate of about 100° C./minute to 190° C. Keep sample at 190° C. for 3 minutes, cool sample at a rate of 10° C./minute to −60° C. to obtain a cool curve heat of fusion (Hf), and keep isothermally at −60° C. for 3 minutes. Then reheat sample at a rate of 10° C./minute to 190° C. to obtain a second heating curve heat of fusion ($\Delta H_f$). Using the second heating curve, calculate the "total" heat of fusion (J/g) by integrating from −20° C. (in the case of semi-crystalline ethylenic (co) polymers except poly(ethylene-co-alpha-olefin) copolymers of density greater than or equal to 0.90 g/cm³) or −40° C. (in the case of poly(ethylene-co-alpha-olefin) copolymers of density less than 0.90 g/cm³) to end of melting. Using the second heating curve, calculate the "room temperature" heat of fusion (J/g) from 23° C. (room temperature) to end of melting by dropping perpendicular at 23° C. Measure and report "total crystallinity" (computed from "total" heat of fusion) as well as "crystallinity at room temperature" (computed from "room temperature" heat of fusion). Crystallinity is measured and reported as percent (%) or weight percent (wt %) crystallinity from the test sample's second heating curve heat of fusion ($\Delta H_f$) and its normalization to the heat of fusion of 100% crystalline polyethylene, where % crystallinity or wt % crystallinity= ($\Delta H_f$*100%)/292 J/g, wherein $\Delta H_f$ is as defined above, * indicates mathematical multiplication, / indicates mathematical division, and 292 J/g is a literature value of heat of fusion ($\Delta H_f$) for a 100% crystalline polyethylene.

Elongation-at-Break Test Method. Measured on 5 inches (12.7 centimeter (cm)) long, fully moisture-cured test samples, prepared according to the Moisture Curing Test Method described below, using an Instron machine and 10 inches per minute (25.4 cm per minute) according to IEC 60502, and expressed as a percent. Minimum value per IEC 60502 specifications is 200%.

Heat Aging Performance Test Method (HEPTM) 1: oxidative induction time (OIT). Measures the time required to initiate oxidation of a test sample of the moisture-cured polyolefin composition, prepared by the below Moisture Curing Test Method, under molecular oxygen when temperature is increased at a rate of 10° C. per minute in a differential scanning calorimeter (DSC). Record the time in minutes until oxidative induction is detected. Oxidative induction time is determined by heating a test sample up from 25° C. at a heating rate of 10° C./min., and observing the time of onset of oxidation by detecting the beginning of oxidation as an exothermic peak in differential scanning calorimetry (DSC). The longer the time in minutes for OIT, the more resistant to oxidative heat aging the test sample. HEPTM 1 is preferred over HEPTM 2 and 3 in assessing overall heat aging performance. In some aspects the moisture-cured polyolefin composition has an OIT according to HEPTM 1 of at least 40 minutes, alternatively at least 45 minutes, alternatively at least 60 minutes.

Heat Aging Performance Test Method (HEPTM) 2: heat aging without conductor. Place test sample of the moisture-cured polyolefin composition, prepared by the below Moisture Curing Test Method, in an oven at 135° C. for 168 hours according to IEC 60502. Remove the resulting heat-aged test sample from the oven, and allow it to cool for 16 hours at room temperature. Assess elongation-at-break and tensile strength of the heat-aged test samples according to their respective Test Methods described herein, and compare the results to elongation-at-break and tensile strength of the test samples prior to heat aging. If the difference in elongation-at-break and tensile strength of the heat-aged test sample is less than 25% of the elongation-at-break and tensile strength of the test sample prior to heat aging, the test sample passes HAPTM 2. If the difference is greater than 25%, the test sample fails HAPTM 2. In some aspects the moisture-cured polyolefin composition passes at least the tensile strength test, alternatively at least the elongation-at-break test, alternatively both (T&E) according to HEPTM 2.

Heat Aging Performance Test Method (HEPTM) 3: heating aging on copper conductor using Mandrel bend test. Heat age a coated conductor, prepared according to the Moisture Curing Test Method described below wherein the 14 AWG conductor is a copper wire, at 150° C. for 10 days, and allowing the heat aged coated conductors to cool to room temperature for 16 hours to give cooled, heat-aged coated conductors. IEC-60502-1 specifies that if after such heat aging it is difficult to remove the coating from the conductor without compromising it, then perform a Mandrel bend test. In the Mandrel bend test, wind the cooled, heat-aged coated conductors around a mandrel at a rate of 1 turn every 5 seconds. The diameter of the mandrel and number of turns are based on the thickness of the copper conductor, as specified by IEC-60502-1. If after winding there is no crack in the coating, the coated conductor passes this test. If there is cracking in the coating of the coated conductor after winding, the coated conductor fails. In some aspects the moisture-cured polyolefin composition passes HEPTM 3.

Hot Creep Test Method. Measures extent of crosslinking, and thus extent of curing, in the test sample of the moisture-cured polyolefin composition prepared by the below Moisture Curing Test Method. Remove the moisture-cured polyolefin composition from the coated wires prepared by the Moisture Curing Test Method, measure its initial length, and subject the measured test sample to hot creep test conditions comprising a load of 20 Newtons per square meter (N/m²) at 200° C. for 15 minutes to give a tested sample. Remove the tested sample from the hot creep test conditions, cool and measure the length of the tested sample. Express the extent of elongation of the test sample as a percentage (%) of the length of the tested sample after hot creep conditions relative to the initial length of test sample prior to hot creep conditions. The lower the hot creep percent, the lower the extent of elongation of a test sample under load, and thus the greater the extent of crosslinking, and thus the greater the extent of curing. In some aspects the moisture-cured polyolefin composition has a hot creep according to Hot Creep Test Method of <30%, alternatively ≤25%, alternatively ≤23%; and alternatively at least 15%, alternatively at least 16%, alternatively at least 18%.

Moisture Curing Test Method. Cures the moisture curable polyolefin composition. Moisture curing may be performed for testing purposes according to the following procedure. Soak 95 wt % of Part 1 and 5 wt % of Part 2. Part 1 is a mixture of 0.5 wt % octyltrimethoxysilane and 99.5 wt % of (hydrolyzable silyl group)-functional polyolefin prepolymer 1 described later (a reactor copolymer of 98.5 wt % ethylene and 1.5 wt % vinyltrimethoxysilane), wherein prepolymer 1 has been soaked with the octyltrimethoxysilane to give the mixture of Part 1. Part 2 is an embodiment of the additive masterbatch composition, and, if present, one or more of additives (D) to (H). Combine Parts 1 and 2 in a wireline extruder to form 25 mils (0.635 millimeter (mm)) thick wall wires with 14 AWG conductors. Place the resulting coated wires in a water bath at 90° C. for three hours, and then remove the coated wires to give an aspect of the coated conductor having a coating comprising an aspect of the moisture-cured polyolefin composition. Remove the moisture-cured polyolefin composition from the coated wires and measure extent of crosslinking by the Hot Creep Test Method, wherein the lower the extent of elongation the higher the extent of crosslinking, and thus the lower the Hot Creep %. Remove other samples of the moisture-cured polyolefin composition from the coated wires and measure tensile strength and elongation-at-break according to the respective test methods described herein. Test other samples of the moisture-cured polyolefin composition removed from the coated wires using HEPTM 1 (oxidative induction time or OIT), and HEPTM 3 (heating aging on copper conductor using Mandrel bend test).

Pellet Stickiness Test Method. Stickiness of additive masterbatch compositions was measured by accelerated thermal aging, which accelerates migration and/or exudation of additive (product of reaction of (B) and (C)) from test samples. Load 50 g test pellets into a glass jar and seal with a lid. Heat sealed jar in a forced air heated oven at 70° C. for 7 days, rating stickiness of each sample of test pellets on a scale from 1 to 10 after each of Day 1 to Day 7. A 1 rating means the pellets are free flowing and do not sick to each other or to the jar. A 10 rating means pellets are very sticky and attached to each other and to the bottom of jar and will not fall down when jar is turned upside down. When some pellets stock to jar when jar is turned upside down and some pellets fall down, the rating is from 2 to 9 and is in proportion to the number of non-sticking pellets (fall down) to number of sticking pellets (do not fall down when jar upended). If slightly less than half the pellets fall down and half the pellets do not fall down, the rating is a 5; if slightly more than half the pellets fall down the rating is 6. If ⅔ of the pellets fall down and ⅓ of the pellets do not fall down, the rating is a 3. If ⅓ of the pellets fall down and ⅔ of the pellets do not fall down, the rating is a 7. For a rating of 2, the number of pellets that fall down is less than all, but more than for a rating of 3. For a rating of 8, the number of pellets that fall down is less than for 9, but more than for 7.

Tensile Strength Test Method. Measured on 5 inches (12.7 centimeters (cm)) long, fully moisture-cured test samples, prepared according to the Moisture Curing Test Method described above, using an Instron machine and 10 inches per minute (25.4 cm per minute) according to IEC 60502, and expressed as pounds per square inch (psi). Minimum value per IEC 60502 specifications is 1,800 psi (12,000 kilopascals (kPa)).

EXAMPLES

Comparative carrier resin 1 (CCR1): a linear low density polyethylene (LLDPE) having a density of 0.920 g/cc³, a melt flow index of 0.55 to 0.75 g/10 min., and a monomodal MWD. By the Crystallinity Test Method parts (A) and (B), CCR1 had a second heating curve heat of fusion ($\Delta H_f$) of 135.1 J/g, and a corresponding crystallinity of 46.3 wt %. Available as product DFH-2065 from The Dow Chemical Company, Midland, Mich., USA.

Comparative carrier resin 2 (CCR2): an ethylene/ethyl acrylate copolymer having a melt flow index from 1.0 to 1.6 g/10 min. and a monomodal MWD. By the Crystallinity Test Method parts (A) and (B), CCR2 had a second heating curve heat of fusion ($\Delta H_f$) of 84.2 J/g, and a corresponding crystallinity of 28.8 wt %. Available as product AMPLIFY™ EA 100 Functional Polymer from The Dow Chemical Company.

Constituent (A1) semi-crystalline polyolefin carrier resin 1: a HDPE having a density of 0.965 g/cc³, a melt flow index of 7.5 to 8.5 g/10 min.; and a monomodal MWD. By the Crystallinity Test Method parts (A) and (B), (A1) had a second heating curve heat of fusion ($\Delta H_f$) of 223.7 J/g, and a corresponding crystallinity of 76.6 wt %. Available as product DGDA-6944 NT from The Dow Chemical Company.

Constituent (A2) semi-crystalline polyolefin carrier resin 2: a HDPE having a density of 0.9545 g/cc³, a melt flow index of 0.22 to 0.38 g/10 min.; and a bimodal MWD. By the Crystallinity Test Method parts (A) and (B), (A2) had a second heating curve heat of fusion ($\Delta H_f$) of 222.2 J/g, and a corresponding crystallinity of 76.1 wt %. Available as product DGDA-1310 NT from The Dow Chemical Company.

Constituent (A3) semi-crystalline polyolefin carrier resin 3: a HDPE having a density of 0.955 g/cc³, a melt flow index of 1.2 to 1.8 g/10 min.; and a monomodal MWD. By the Crystallinity Test Method parts (A) and (B), (A3) has a second heating curve heat of fusion ($\Delta H_f$) of 181.1 J/g, and a corresponding crystallinity of 62.0 wt % (based on data for product DMDA-1250). Available as product DGDA-1250 NT from The Dow Chemical Company.

Constituent (A4) semi-crystalline polyolefin carrier resin 4: a HDPE having a density of 0.944 g/cc³, a melt flow index of 0.87 to 1.07 g/10 min.; and a monomodal MWD. Crystallinity Test Method data unavailable but expect crystallinity from >50 to <100 wt %. Available as product DGDA-4593 NT from The Dow Chemical Company.

Constituent (A5) semi-crystalline polyolefin carrier resin 5: a HDPE having a density of 0.935 g/cc³, a melt flow index of 0.7 to 0.9 g/10 min.; and a monomodal MWD. By the Crystallinity Test Method parts (A) and (B), (A5) had a second heating curve heat of fusion ($\Delta H_f$) of 171.2 J/g, and a corresponding crystallinity of 58.6 wt %. Available as product DGDA-3580 NT from The Dow Chemical Company.

Constituent (B1): an alkyl-substituted naphthylsulfonic acid (Nacure CD-2180).

Constituent (C1): bis(4-(1-methyl-1-phenylethyl)phenyl) amine (Naugard 445).

Additive (D1): bis(4,6-dimethylphenyl)isobutylidene (Lowinox 22IB46).

Additive (D2): distearyl-3,3-thiodiproprionate (DSTDP).

Additive (G1): oxaylyl bis(benzylidene hydrazide) (OABH).

(Hydrolyzable silyl group)-functional polyolefin prepolymer 1 (Host Polymer 1): reactor copolymer of 98.5 wt % ethylene and 1.5 wt % vinyltrimethoxysilane. Prepared by copolymerizing ethylene and vinyltrimethoxysilane in a tubular high pressure polyethylene reactor with a free radical initiator. Available as DFDA-5451 from The Dow Chemical Company.

Comparative Examples 1 and 2 (CE1 & CE2): comparative additive masterbatch compositions. See compositions and stickiness test results described in Tables 1 and 2 later.

Inventive Examples 1 to 5 (IE1 to IE5): inventive additive masterbatch compositions. See compositions and stickiness test results described in Tables 1 and 2 below.

TABLE 1

Compositions of CE1, CE2 and IE1 to IE5.

| | CE1 | CE2 | IE1 | IE2 | IE3 | IE4 | IE5 |
|---|---|---|---|---|---|---|---|
| CCR1 | 44.97 | None | None | None | None | None | None |
| CCR2 | 44.97 | 44.97 | None | None | None | None | None |
| (A1) wt % | None | 44.97 | 89.94 | None | None | None | None |
| (A2) wt % | None | None | None | 89.94 | None | None | None |
| (A3) wt % | None | None | None | None | 89.94 | None | None |
| (A4) wt % | None | None | None | None | None | 89.94 | None |
| (A5) wt % | None | None | None | None | None | None | 89.94 |
| (B1) wt % | 4 | 4 | 4 | 4 | 4 | 4 | 4 |
| (C1) wt % | 3.3 | 3.3 | 3.3 | 3.3 | 3.3 | 3.3 | 3.3 |
| (D1) wt % | 1 | 1 | 1 | 1 | 1 | 1 | 1 |
| (D2) wt % | 1 | 1 | 1 | 1 | 1 | 1 | 1 |
| (G1) wt % | 0.76 | 0.76 | 0.76 | 0.76 | 0.76 | 0.76 | 0.76 |
| Total wt % | 100 | 100 | 100 | 100 | 100 | 100 | 100 |

TABLE 2

Stickiness of CE1, CE2 and IE1 to IE5.

| | Ex. No. | | | | | |
|---|---|---|---|---|---|---|
| | CE1 | CE2 | IE1 | IE2 | IE3 | IE4 | IE5 |
| Stickiness Day 1 | 4 | 3 | 1 | 1 | 1 | 1 | 1 |
| Stickiness Day 2 | 6 | 4 | 1 | 1 | 1 | 1 | 1 |
| Stickiness Day 3 | 7 | 4 | 1 | 1 | 1 | 1 | 1 |
| Stickiness Day 4 | 7 | 5 | 1 | 1 | 1 | 1 | 2 |
| Stickiness Day 7 | 8 | 5 | 1 | 1 | 1 | 1 | 3 |

Stickiness data in Table 2 show that the comparative additive masterbatch compositions, based on carrier resin composed of low density polyethylene (LDPE) or ethylene/ethyl acrylate (EEA) copolymer were substantially sticky right from Day 1. Ethylene/vinyl acetate (EVA) copolymer would be expected to behave similarly to EEA copolymer. In beneficial contrast, the inventive additive masterbatch compositions of IE1 to IE4, based on semi-crystalline HDPE carrier resin, were free flowing on Days 1 to 4 and 7 and the inventive additive masterbatch composition of IE5, based on semi-crystalline HDPE carrier resin, was free flowing on Days 1 to 3, slightly sticky on Day 4, and slightly more sticky on Day 7. Even on Day 7, however, IE5 was significantly less sticky than CE1 and CE2 on Day 7.

Comparative Examples A1 and A2 and Inventive Examples A1 to A5: comparative and inventive moisture-curable polyolefin compositions and moisture-cured polyolefin compositions prepared therefrom by curing same. Follow Moisture Curing Test Method using 5 wt % additive masterbatch compositions of CE1, CE2 and IE1 to IE5, respectively, and 95 wt % of the Host Polymer 1 to give moisture-curable polyolefin compositions of CEA1, CEA2, and IEA1 to IEA5, respectively. Cure these curable compositions to give moisture-cured polyolefin compositions of CEA1, CEA2, and IEA1 to IEA5, respectively. Test these moisture cured compositions using Heat Aging Performance Test Method (HEPTM) 1: oxidative induction time reported in minutes ("OIT (min.)") and Heat Aging Performance Test Method (HEPTM) 3: heating aging on copper conductor using Mandrel bend test reported as pass or fail ("Mandrel (P/F)"). Measure second heating curve heat of fusion ($\Delta H_f$) and determine crystallinity according to the Crystallinity Test Method parts (A) and (B). Results are reported below in Table 3.

Heat aging performance data in Table 3 show that the moisture-cured polyolefin compositions of inventive examples (IEA1 to IEA5) made from moisture-curable polyolefin compositions prepared using the inventive additive masterbatch (MB) compositions IE1 to IE5, respectively, have comparable heat aging performance as the moisture-cured polyolefin compositions comparative examples CEA1 and CEA2 made from moisture-curable polyolefin compositions prepared using comparative additive masterbatch (MB) compositions CE1 and CE2, respectively. The inventive additive masterbatch compositions having a carrier resin consisting essentially of semi-crystalline HDPE heat age as well as comparative additive masterbatch compositions having a carrier resin consisting essentially a blend of LLDPE and EEA (CEA1) or a blend of EEA and HDPE (CEA2). Table 2 data show the semi-crystalline polyolefin carrier resin of the inventive additive masterbatch compositions is effective (as good as EEA and LLDPE) at delivering antioxidants to the host resin, and show that the inventive moisture-cured polyolefin compositions (e.g., of IEA1 to IEA2) have the performance that make them useful in a variety of applications including as a component of a coating of a coated conductor such as a coated wire or coated cable.

Incorporate by reference here the below claims as numbered aspects except replace "claim" and "claims" by "aspect" or "aspects," respectively.

The invention claimed is:

1. An additive masterbatch composition comprising (A) a semi-crystalline polyolefin carrier resin and an additive package comprising a product of a reaction of (B) an acidic condensation catalyst and (C) a secondary diarylamine of formula (I): $(R^1-Ar)_2NH$ (I), wherein each Ar is benzene-1,4-diyl or both Ar are bonded to each other and taken together with the NH of formula (I) constitute a carbazol-3,6-diyl; and each $R^1$ is independently ($C_1$-$C_{20}$) hydrocarbyl; wherein (A) is 50 to 99 weight percent (wt %) and the additive package is from 1 to 50 wt % of total weight of the additive masterbatch composition; wherein the additive masterbatch composition is free of an ethylene/silane copolymer; wherein the (A) semi-crystalline polyolefin carrier resin consists essentially of: (i) a semi-crystalline medium density polyethylene; (ii) a semi-crystalline high density polyethylene; (iii) a semi-crystalline polypropylene; (iv) a semi-crystalline poly(ethylene-co-alpha-olefin) copolymer; (v) a combination of any two or more of (i), (ii) and (iv); (vi) the (A) semi-crystalline polyolefin carrier resin has a crystallinity of 50 to <100 wt %; or (vii) any one of limitations (i) to (v) and the (A) semi-crystalline polyolefin carrier resin has a crystallinity of 50 to <100 wt %.

TABLE 3

Heat aging performance of moisture-cured polyolefin compositions.

| | Ex. No. | | | | | | |
|---|---|---|---|---|---|---|---|
| | CEA1 | CEA2 | IEA1 | IEA2 | IEA3 | IEA4 | IEA5 |
| Host Polymer 1 | 95 wt % | 95 wt % | 95 wt % | 95 wt % | 95 wt % | 95 wt % | 95 wt % |
| Additive MB Ex. | CE1 5 wt % | CE2 5 wt % | IE1 5 wt % | IE2 5 wt % | IE3 5 wt % | IE4 5 wt % | IE5 5 wt % |
| OIT at 200° C. (min.) | 67.3 | Not Tested | 58.4 | 76.5 | Not Tested | 76.1 | Not Tested |
| Mandrel (P/F) | Pass | Pass | Pass | Pass | Pass | Pass | Pass |

2. The additive masterbatch composition of claim 1 wherein the (A) semi-crystalline polyolefin carrier resin consists of the: (i) semi-crystalline medium density polyethylene; (ii) semi-crystalline high density polyethylene; (iii) semi-crystalline polypropylene; (iv) semi-crystalline poly(ethylene-co-alpha-olefin) copolymer; (v) combination of any two or more of (i), (ii) and (iv); (vi) the (A) semi-crystalline polyolefin carrier resin has a crystallinity of 50 to <100 wt %; or (vii) any one of limitations (i) to (v) the (A) semi-crystalline polyolefin carrier resin has a crystallinity of 50 to <100 wt %.

3. The additive masterbatch composition of claim 1 wherein the (A) semi-crystalline polyolefin carrier resin has (i) a density of at least 0.925 g/cm$^3$ and is a polyethylene or a density of 0.89 to 0.90 g/cm$^3$ and is a polypropylene; (ii) a crystallinity of at least 50 wt % and is a polyethylene; (iii) a melt flow index (MFI) of 0.1 to 20 grams per 10 minutes (g/10 min.) at 190° C./2.16 kg load and is a polyethylene or a melt flow rate (MFR) of 0.5 to 50 g/10 min at 230 C./2.16 kg load and is a polypropylene; (iv) a molecular weight distribution (MWD) that is monomodal; (v) a MWD that is bimodal; (vi) both (i) and (ii); (vii) both (i) and (iii); (viii) both (ii) and (iii); (ix) both (iv) and at least one of (i) to (iii); or (x) both (v) and at least one of (i) to (iii).

4. The additive masterbatch composition of claim 1 wherein: (i) the product of a reaction of (B) and (C) comprises a salt formed by an acid/base reaction of (B) and (C); (ii) the additive package further comprises unreacted (B) but not unreacted (C); (iii) the additive package further comprises unreacted (C) but not unreacted (B); or (iv) the additive package further comprises unreacted (B) and unreacted (C).

5. The additive masterbatch composition of claim 1 wherein the (B) acidic condensation catalyst is (i) organophosphonic acid or a hydrogen halide; (ii) an organosulfonic acid; (iii) an alkyl-substituted arylsulfonic acid; (iv) an alkyl-substituted arylsulfonic acid wherein there is/are 1 or 2 ($C_5$-$C_{20}$)alkyl substituent(s) and 1 aryl group that is phenyl or naphthyl; (v) a ($C_1$-$C_5$)alkylphosphonic acid, wherein the ($C_1$-$C_5$) alkyl is unsubstituted or substituted with one —$NH_2$ group; (vi) HF, HCl, or HBr; or (vii) a combination of any two or more of (i) to (vi).

6. The additive masterbatch composition of claim 1 further comprising at least one additive selected from: (D) one or two second antioxidants, each having a structure different than formula (I) and, when there are two second antioxidants, different than each other; (E) a processing aid; (F) a colorant; (G) a metal deactivator; (H) an (unsaturated carbon-carbon bond)-free hydrolyzable silane; (I) a corrosion inhibitor; and (J) a combination of any two or more of additives (D) to (I).

7. A moisture-curable polyolefin composition comprising the additive masterbatch composition of claim 1 and a (hydrolyzable silyl group)-functional polyolefin prepolymer; wherein in the (hydrolyzable silyl group)-functional polyolefin prepolymer: (i) each hydrolyzable silyl group is independently a monovalent group of formula (II): ($R^2$)$_m$($R^3$)$_{3-m}$Si—(II); wherein subscript m is an integer of 1, 2, or 3; each $R^2$ is independently H, HO-, ($C_1$-$C_6$)alkoxy, ($C_2$-$C_6$)carboxy, (($C_1$-$C_6$)alkyl)$_2$N-, ($C_1$-$C_6$) alkyl(H)C=NO-, or (($C_1$-$C_6$)alkyl)$_2$C=NO-; and each $R^3$ is independently ($C_1$-$C_6$)alkyl or phenyl; (ii) the polyolefin is polyethylene based, poly(ethylene-co-($C_3$-$C_{40}$)alpha-olefin)-based, or a combination thereof; or (iii) both (i) and (ii).

8. A method of making a moisture-curable polyolefin composition, the method comprising mixing a (hydrolyzable silyl group)-functional polyolefin prepolymer and a divided solid form of the additive masterbatch composition of claim 1 so as to give a mixture;

and melting or extruding the mixture so as to make the moisture-curable polyolefin composition.

9. A moisture-cured polyolefin composition that is a product of moisture curing the moisture curable polyolefin composition of claim 7 to give the moisture-cured polyolefin composition.

10. A manufactured article comprising a shaped form of the moisture-cured polyolefin composition of claim 9.

11. A coated conductor comprising a conductive core and a polymeric layer at least partially surrounding the conductive core, wherein at least a portion of the polymeric layer comprises the moisture-cured polyolefin composition of claim 9.

12. A method of conducting electricity, the method comprising applying a voltage across the conductive core of the coated conductor of claim 11 so as to generate a flow of electricity through the conductive core.

13. The additive masterbatch composition of claim 2 wherein the (A) semi-crystalline polyolefin carrier resin consists of limitation (viii) and has a crystallinity from 58 to 78 wt %.

* * * * *